United States Patent
Campbell et al.

(10) Patent No.: US 9,157,260 B1
(45) Date of Patent: Oct. 13, 2015

(54) HYDRAULICALLY ACTUATED LATCH MECHANISM

(71) Applicant: The Boeing Company, Chicago, IL (US)

(72) Inventors: Lowell Bruce Campbell, Mukilteo, WA (US); Richard Leroy Rankin, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 13/869,090

(22) Filed: Apr. 24, 2013

(51) Int. Cl.
*B64D 11/00* (2006.01)
*E05C 3/16* (2006.01)

(52) U.S. Cl.
CPC ................ *E05C 3/16* (2013.01); *B64D 11/003* (2013.01)

(58) Field of Classification Search
CPC .................................. B64D 11/03; B05D 3/16
USPC ............ 244/118.5, 129.4, 129.5; 60/571, 579
See application file for complete search history.

(56) References Cited

U.S. PATENT DOCUMENTS

| | | | | |
|---|---|---|---|---|
| 2,179,495 A | * | 11/1939 | Court et al. | 114/117 |
| 2,631,876 A | * | 3/1953 | Lin | 292/51 |
| 2,882,686 A | * | 4/1959 | Griffith | 60/572 |
| 3,113,352 A | * | 12/1963 | Gibbs et al. | 49/276 |
| 4,122,678 A | * | 10/1978 | Wilson | 60/571 |
| 4,313,631 A | * | 2/1982 | Johnson | 292/201 |
| 4,368,937 A | * | 1/1983 | Palombo et al. | 312/325 |
| 4,567,727 A | * | 2/1986 | Grams | 60/546 |
| 4,825,655 A | * | 5/1989 | Buchl et al. | 60/546 |
| 5,441,218 A | * | 8/1995 | Mueller et al. | 244/118.1 |
| 5,823,472 A | * | 10/1998 | Luria | 244/118.1 |
| 6,029,450 A | * | 2/2000 | Wittich | 60/571 |
| 6,484,969 B2 | * | 11/2002 | Sprenger et al. | 244/118.5 |
| 6,598,829 B2 | * | 7/2003 | Kamstra | 244/118.1 |
| 6,691,951 B2 | * | 2/2004 | Frazier | 244/118.1 |
| 7,090,314 B2 | * | 8/2006 | Burrows et al. | 312/246 |
| 7,552,954 B2 | | 6/2009 | Rozo et al. | |
| 7,726,606 B2 | * | 6/2010 | Graf et al. | 244/118.5 |
| 7,938,363 B2 | * | 5/2011 | Benkart et al. | 244/118.1 |
| 8,262,022 B2 | | 9/2012 | Young et al. | |
| 2009/0302621 A1 | | 12/2009 | Rozo et al. | |
| 2011/0140462 A1 | | 6/2011 | Lin et al. | |
| 2011/0253837 A1 | * | 10/2011 | Lee et al. | 244/118.5 |
| 2011/0254705 A1 | | 10/2011 | Hashberger et al. | |
| 2012/0325963 A1 | | 12/2012 | Young et al. | |
| 2014/0197721 A1 | * | 7/2014 | Savian et al. | 312/248 |

FOREIGN PATENT DOCUMENTS

EP 1351847 B1 7/2004

* cited by examiner

*Primary Examiner* — Brian M O'Hara
*Assistant Examiner* — Michael Kreiner
(74) *Attorney, Agent, or Firm* — Hugh P. Gortler

(57) ABSTRACT

A storage system comprises a storage compartment having a compartment door, a plurality of latches for latching the door, a plurality of slave cylinders coupled to the latches, and a master cylinder in fluid communication with the slave cylinders for causing the slave cylinders to simultaneously unlatch the latches.

20 Claims, 7 Drawing Sheets

HYDRAULICALLY ACTUATED LATCH MECHANISM

BACKGROUND

Overhead stowage bins of commercial aircraft are required to stay closed during turbulence and all other flight conditions. To satisfy this requirement, the bins are equipped with dual retention latch mechanisms, which have redundant latches. A bin is opened only if all of its redundant latches are released simultaneously. In addition, force for releasing the latches should be sufficient to prevent uncommanded opening under all flight conditions.

A dual retention latch mechanism may include a mechanical actuation linkage for opening a bin. The linkage should satisfy the following constraints: it should apply a sufficient force to release both latches simultaneously; and it should be simple and easy to operate with a single hand.

Due to these constraints, the mechanical linkages in commercial aircraft are typically heavy and complex. In a commercial aircraft having sixty bins, for instance, the linkages can add more than one hundred pounds of weight to the aircraft. This additional weight increases fuel costs and other aircraft operating costs.

SUMMARY

According to an embodiment herein, a storage system comprises a storage compartment having a compartment door, a plurality of latches for latching the door, a plurality of slave cylinders coupled to the latches, and a master cylinder in fluid communication with the slave cylinders for causing the slave cylinders to simultaneously unlatch the latches.

According to another embodiment herein, a latch mechanism for latching a door to a structure comprises first and second door latches, and first and second slave cylinders for applying unlatching forces to the first and second latches, respectively. The latch mechanism further comprises a master cylinder in fluid communication with the first and second slave cylinders for causing the slave cylinders to simultaneously apply the unlatching forces to the first and second latches.

According to another embodiment herein, an aircraft comprises a plurality of compartments including compartment doors, and a plurality of hydraulically actuated latch mechanisms for the doors. Each latch mechanism includes a plurality of slave cylinders, and a master cylinder in fluid communication with the slave cylinders for causing the slave cylinders to simultaneously unlatch its associated door.

These features and functions may be achieved independently in various embodiments or may be combined in other embodiments. Further details of the embodiments can be seen with reference to the following description and drawings.

DETAILED DESCRIPTION

Figure 1:
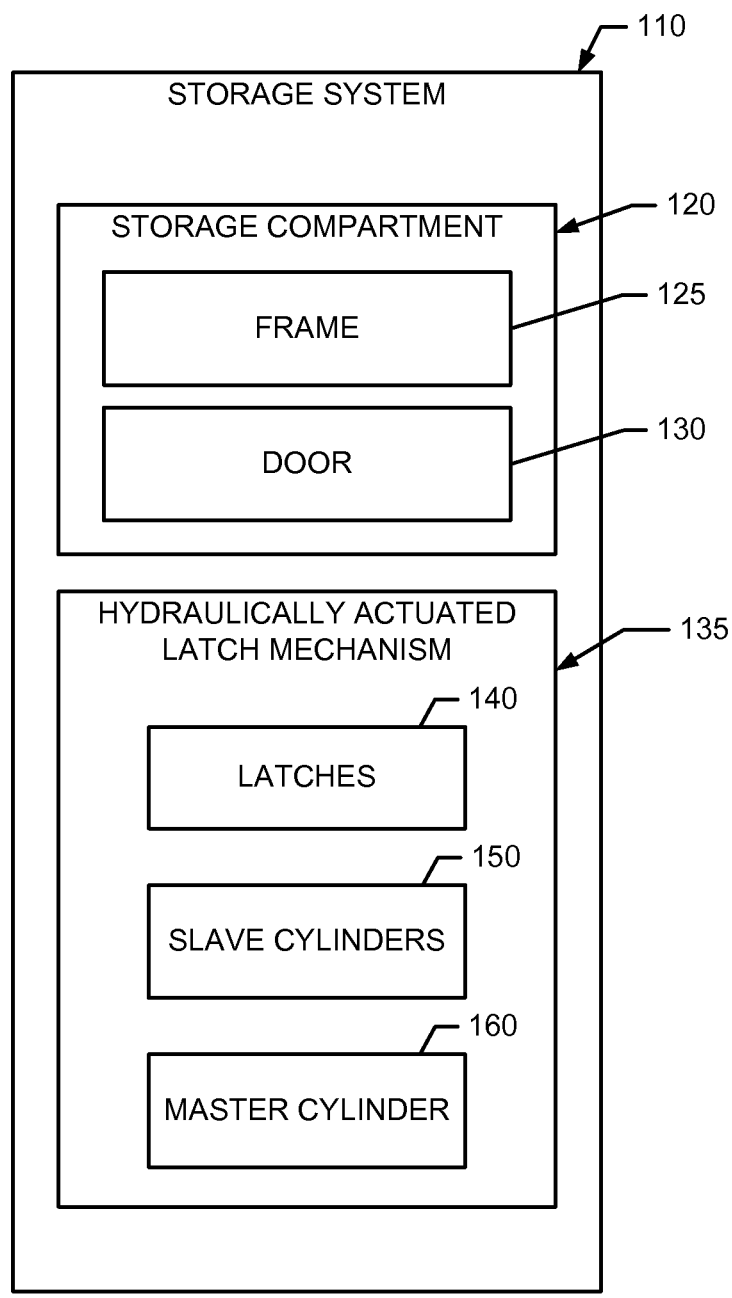
FIG. 1 is an illustration of a storage system including a hydraulically actuated latch mechanism.

Reference is made to FIG. 1, which illustrates a storage system 110 including a storage compartment 120 having a frame 125 and a door 130. The frame 125 or the door 130 or both may define a storage space. The system 110 is not limited to any particular way of coupling the door 130 to the frame 125. The door 130 may be rotated or translated between an open position and a closed position. As a first example, one side of the door 130 is hinged to the frame 125, and swings open and shut. As a second example, the door 130 is attached to an end of a drawer, which slides into and out of the frame 125. As a third example, the door 130 is coupled to the frame 125 to translate open and shut.

The storage system 110 further includes a hydraulically actuated latch mechanism 135 including a plurality of latches 140 for latching the door 130. The latches 140 may secure the door 130 in the open position, or the closed position, or an intermediate position. The latches 140 are not limited to any particular type. Examples of latch types include, but are not limited to, pawl, double pawl, deadbolt, and slam latches.

The latch mechanism 135 further includes a plurality of slave cylinders 150 for unlatching the latches 140, and a master cylinder 160 in fluid communication with the slave cylinders 150 for causing the slave cylinders 150 to simultaneously unlatch the latches 140. As but one example, each slave cylinder 150 may include a piston that is mechanically coupled to a corresponding latch 140, and the master cylinder 160 includes a piston that is hydraulically coupled to each slave cylinder piston by a non-compressible fluid. When a force is applied to the master cylinder piston, it transmits the force (via the fluid) to the pistons of the slave cylinders 150, thereby causing the slave cylinder pistons to simultaneously unlatch the latches 140.

In some embodiments of the latch mechanism 135, the latches 140 may stay unlatched when the force is removed from the master cylinder piston and, therefore, from the slave cylinder pistons. The latches 140 are closed upon application of an external force, for example, by closing the door 130. In other embodiments, the latches 140 may be biased back to closed positions upon removal of the force from the master cylinder piston. For example, the slave and master cylinders 150 and 160 include spring-loaded mechanisms that constrain the movement of the pistons to be identical only in the open stroke and that use a spring force to independently return each latch 140 to a closed position.

Figure 2:
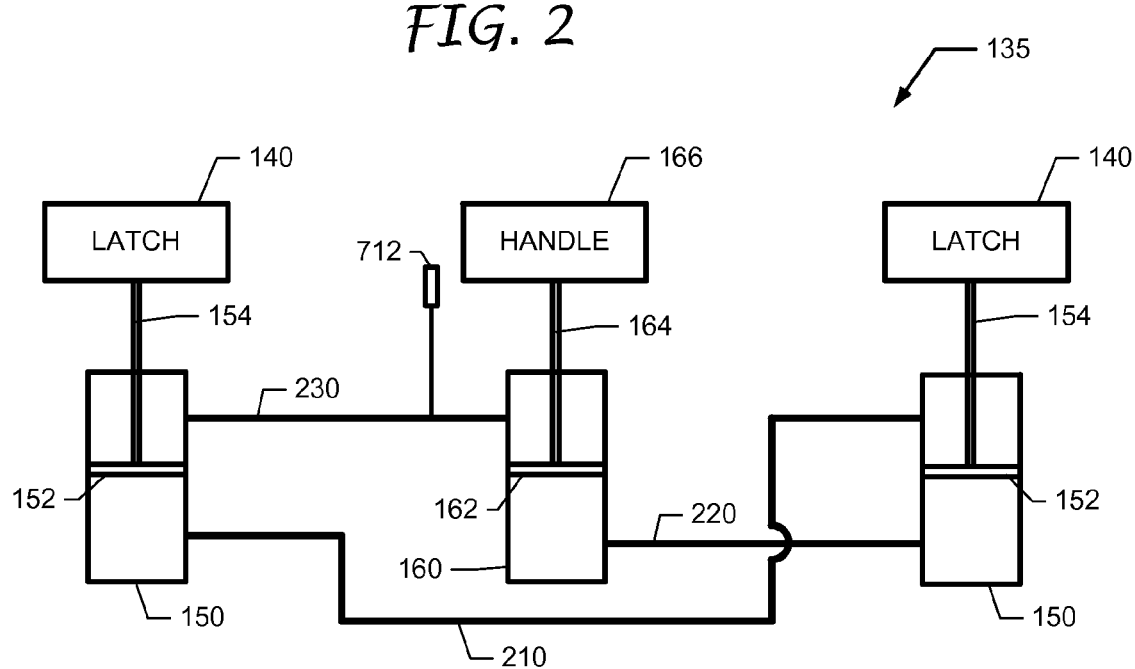
FIGS. 2 and 3 are illustrations of embodiments of a hydraulically actuated dual retention latch mechanism.

Reference is now made to FIG. 2, which schematically illustrates a first embodiment of a hydraulically actuated dual retention latch mechanism 135 including a single master cylinder 160 and first and second slave cylinders 150. Each slave cylinder 150 includes a slave piston 152 and a linkage 154 that mechanically couples the slave piston 152 to its corresponding latch 140. The master cylinder 160 includes a master piston 162 and means 164 for coupling the master piston 162 to a handle 166. FIG. 2 shows a mechanical linkage 164, but in some embodiments, the handle 166 could be coupled hydraulically, pneumatically, or electromechanically to the master cylinder 160.

In some embodiments, a switch may be used instead of a handle. In these embodiments, the means may include an electromechanical actuator for moving the master piston 162 in response to the switch.

The master cylinder 160 and the slave cylinders 150 form a closed circuit. In the closed circuit, the movement of the slave cylinder pistons 152 is constrained to be simultaneous with movement of the master cylinder piston 162. When the handle 166 applies a force to the master cylinder piston 162, that force is transmitted (via the fluid) to the pistons 152 of the slave cylinders 150, thereby causing the slave cylinder pistons 152 to simultaneously unlatch the latches 140.

The master cylinder 160 may be "daisy-chained" with the slave cylinders 150 via hydraulic lines 210, 220 and 230 so that the output flow from one slave cylinder 150 is used to pressurize the next slave cylinder 150 in the circuit. Since the fluid is incompressible, it will not allow any lagging between the pistons 152 and 162 of the slave and master cylinders 150 and 160.

The storage system 110 provides several advantages over conventional systems that use mechanical linkages to simultaneously provide unlatching forces to a plurality of latches. The hydraulically actuated latch mechanism 135 is lighter and less complex than a mechanical actuation linkage.

The hydraulically actuated latch mechanism 135 is scalable. Additional latches 140 may be added simply by adding additional slave cylinders 150 and adding lines that communicate with the master cylinder 160. In contrast, additional latches would increase the complexity of the mechanical actuation linkage and cause its redesign.

The hydraulically actuated latch mechanism 135 has fewer moving and wear parts than a mechanical actuation linkage. Consequently, maintenance costs are lower.

The hydraulically actuated latch mechanism 135 allows for greater storage space, since a large mechanical linkage is eliminated. That is, the storage system 110 provides better volume utilization.

Force multiplication enables the hydraulically actuated latch mechanism to apply a greater unlatching force than a mechanical actuation linkage. Piston area of the master cylinder piston 162 may be different than piston area of the slave cylinder pistons 152. Force multiplication allows the unlatching forces applied to the latches 140 to be greater than the force applied by the handle 166 to the master cylinder piston 162.

The hydraulically actuated latch mechanism 135 can be adjusted for various force and travel requirements of the handle 166. The mechanism 135 may be designed with a non-linear (e.g., curved) stroke instead of a linear stroke. For instance, force (F) applied to the handle 166 may be $F=k*SQRT(x)$. For a non-linear stroke, the mechanism 135 may use standard hydraulic pressure bypass valves. For older passengers with less finger and hand strength, being able to adjust force per inch of travel is advantageous.

The hydraulically actuated latch mechanism 135 offers far greater flexibility as to the location of the cylinders 150 and 160, as well as the handle 166 for actuating the master cylinder 160. Handle location is not limited to a location along a mechanical linkage that extends between latches. As a first example, the master cylinder 160 and handle 166 are attached to the door 130, while the slave cylinders 150 are attached to the frame 125. As a second example, the handle 166, slave cylinders 150 and the master cylinder 160 are all attached to the frame 125.

Figure 3:
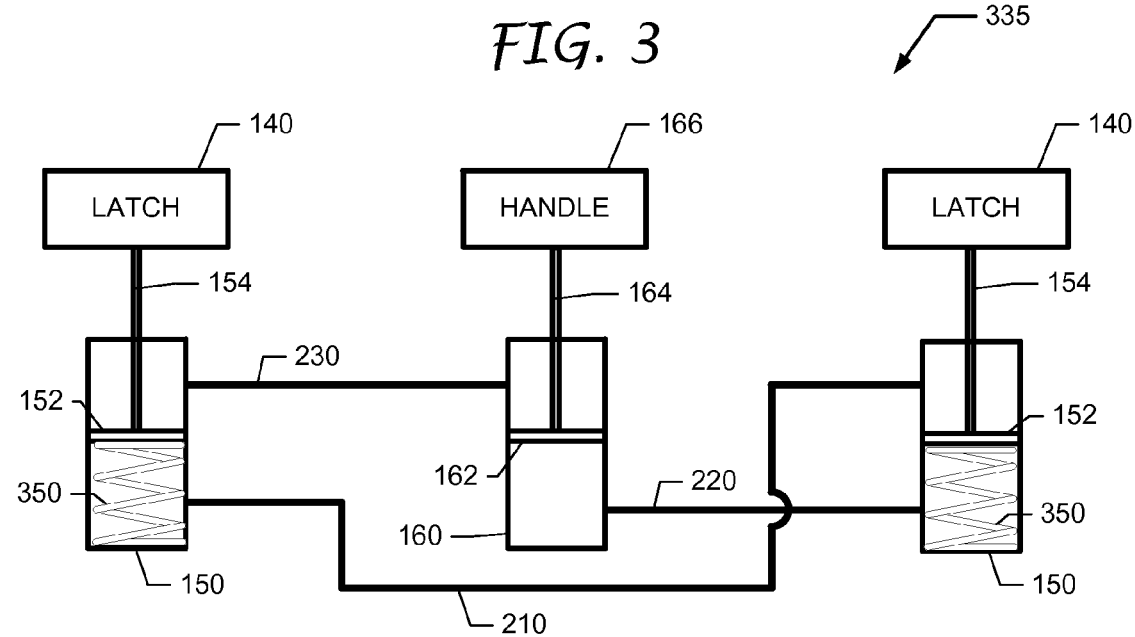

Reference is now made to FIG. 3, which schematically illustrates a second embodiment of a hydraulically actuated dual retention latch mechanism 335. The latch mechanism 335 includes spring-loaded mechanisms 350 that constrain the movement of the pistons 152 to be identical only in the open stroke and that use a spring force to independently return each latch 140 to a closed position.

The storage system 110 is not limited to any particular application. However, it is extremely useful for large commercial aircraft.

Figure 4:
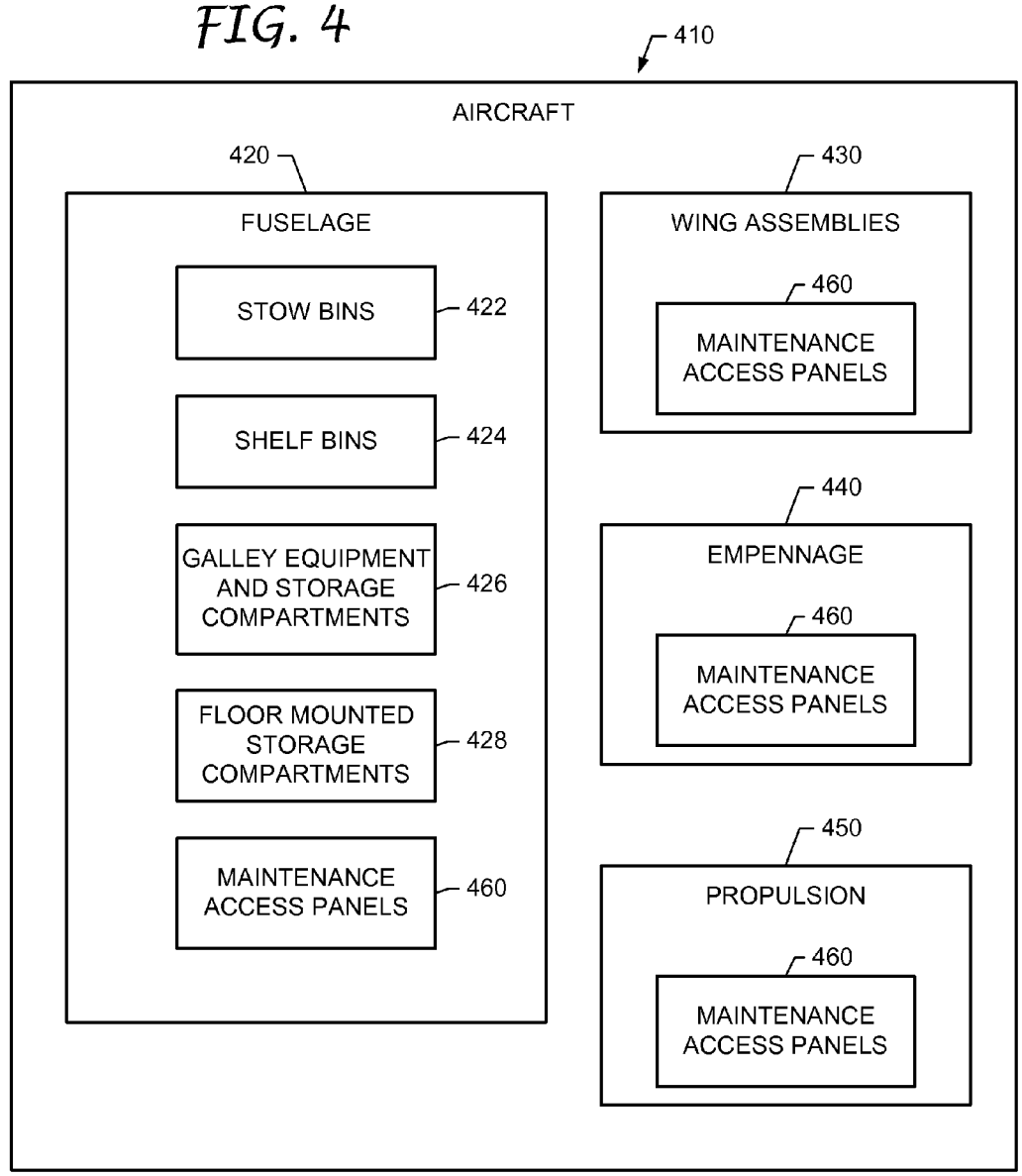
FIG. 4 is an illustration of an aircraft and various aircraft compartments that may use a hydraulically actuated dual retention latch mechanism.

Reference is now made to FIG. 4, which illustrates an aircraft 410 including a fuselage 420, wing assemblies 430, empennage 440, and propulsion system 450. FIG. 4 also illustrates various aircraft compartments that may use a hydraulically actuated dual retention latch mechanism 135. Compartments in the fuselage 420 may include stowage bins 422 and shelf bins 424 above passenger seating, galley equipment and storage compartments 426, and floor mounted storage 428. The compartments may also include maintenance access panels 460 for electrical equipment and other line replaceable units, not only in the fuselage 420, but also in the wing assemblies 430, empennage 440, and propulsion system 450. By replacing mechanical actuator linkages and latches with the hydraulically actuated latch mechanisms 135 for some or all of these compartments 422-428 and 460, the savings in weight and, therefore, fuel costs can be substantial.

Figure 5:
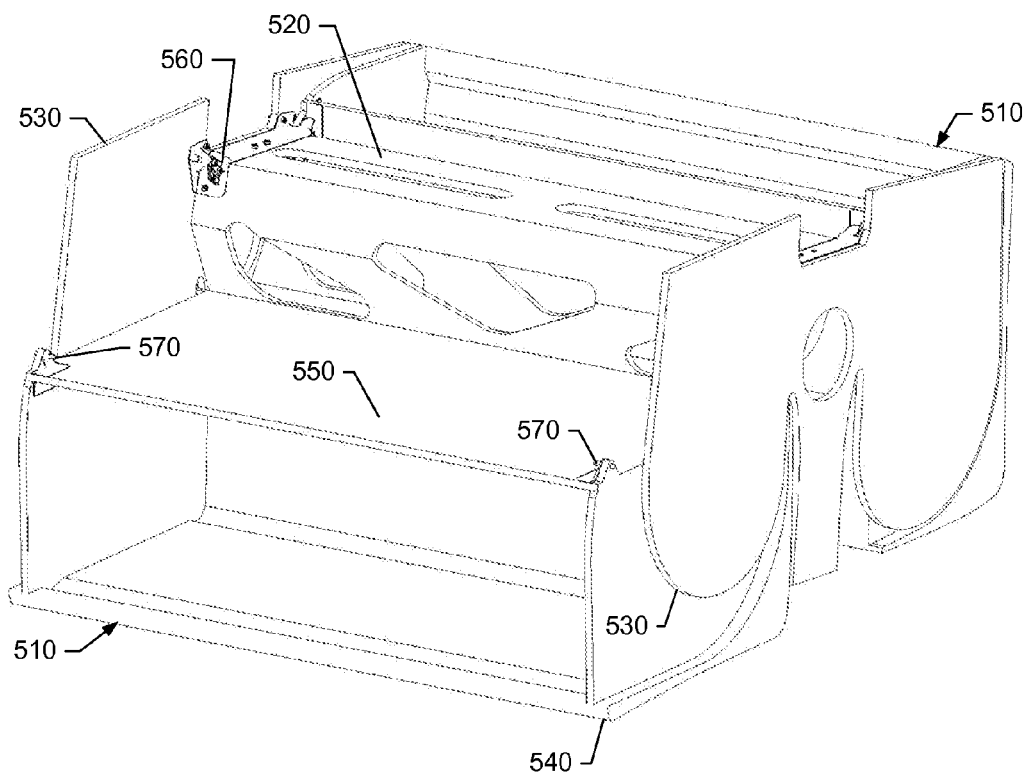
FIG. 5 is an illustration of overhead stowage bins for a commercial aircraft.

Reference is now made to FIG. 5, which illustrates overhead stow bins 510 for a commercial aircraft. The overhead stow bins 510 are arranged back-to-back, with the far stow bin 510 shown in a closed position, and the near stow bin 510 shown in an open position. Each stow bin 510 includes a frame formed by a strong back 520 and two sidewalls 530. The strong back 520 may be shared by both stow bins 510. Each stow bin 510 further includes a door 540 pivot hinged to the strong back 520. A bucket 550 is attached to, or formed integrally with, the door 540. The bucket 550 provides storage space.

Each stow bin 510 also includes a hydraulically actuated dual retention latch mechanism. The latch mechanism includes a first latch 560 that is configured to latch a first side of the door 540 and a second latch 560 that is configured to latch a second side of the door 540. The door 540 includes latch pins 570 that are engaged and disengaged by the latches 560.

Figure 6A:
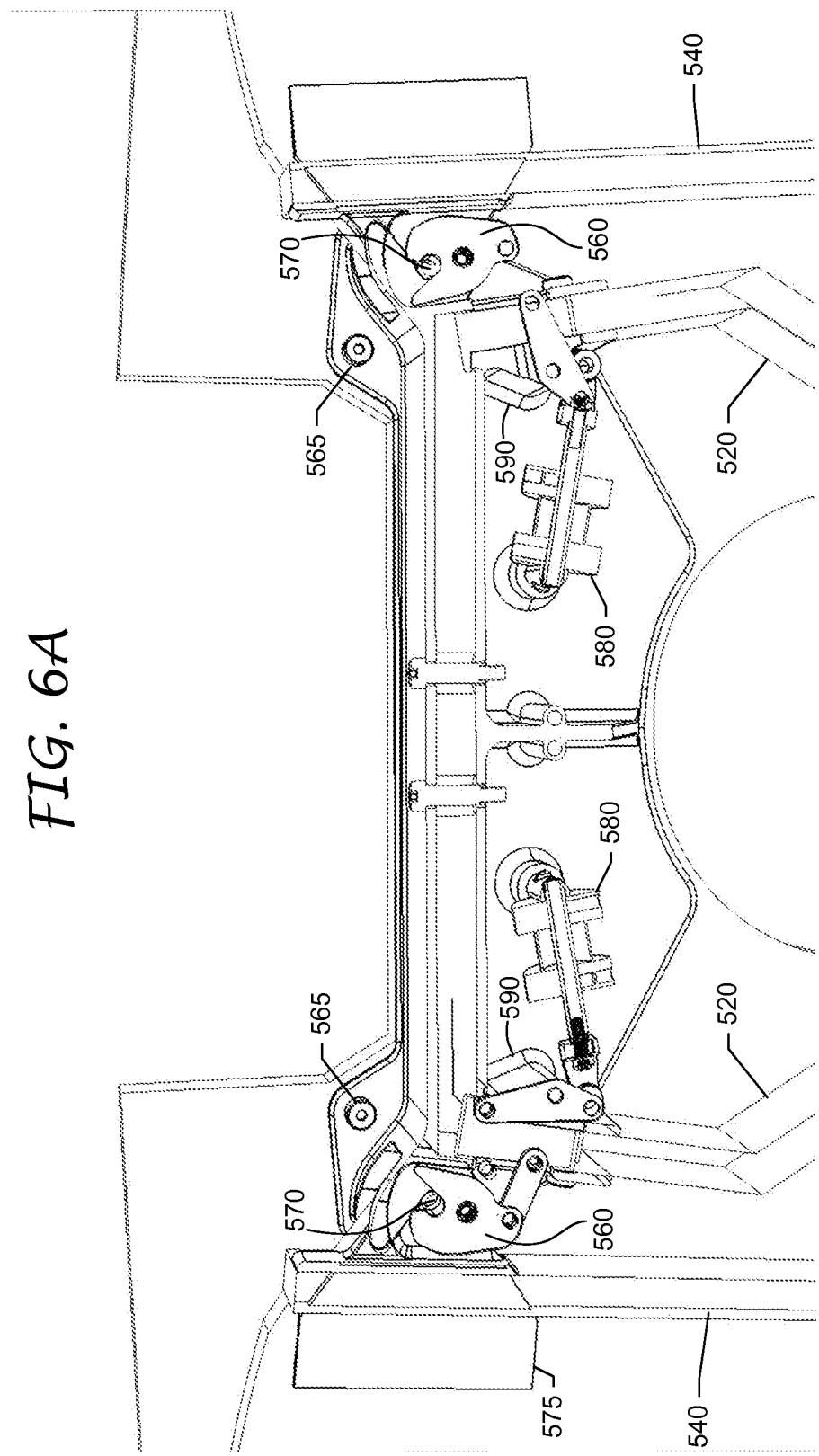
FIGS. 6A and 6B are illustrations of a portion of a hydraulically actuated dual retention latch mechanism for the stowage bins of FIG. 5.
Figure 6B:
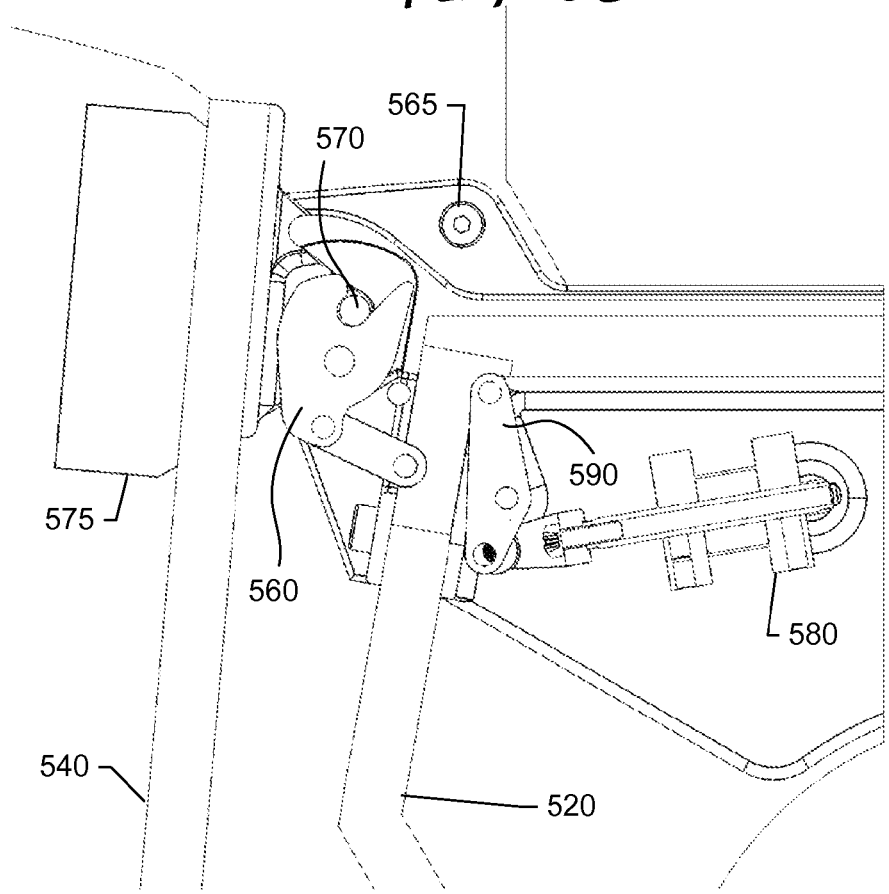

Additional reference is made to FIGS. 6A and 6B, which illustrate an example of a latch mechanism including a pawl latch 560. The pawl latch 560 is fastened to the strong back 520 by fasteners 565. When the door 540 is closed (as shown in FIGS. 6A and 6B), the pawl latch 560 engages a pin 570 on the door 540. A stiffener 575 provides support for the pin 570.

The latch mechanism further includes a slave cylinder 580 fastened to the strong back 520. The slave cylinder 580 is also coupled to the pawl latch 560 by a mechanical linkage 590. When the slave cylinder 580 is actuated, it extends the linkage 590, which causes the pawl latch 560 to release the pin 570.

The slave cylinder 580 may be located adjacent to the pawl latch 560 in a least weight orientation. For example, the slave cylinder 580 may be located adjacent to the strong back 520 or other existing primary structure hardpoint.

The master cylinder (not shown) may be mounted behind the door 540. The master cylinder may be connected to the slave cylinders 580 by flexible hoses, which may be run between face sheets inside door or stow bin panels, protruding adjacent to the pivot hinge with a slack loop to allow rotation.

The location of the master cylinder and handle (not shown in FIGS. 6A and 6B) are not limited to the door 540 or the strong back 520. The handle may be placed next to the door 540 on any convenient structure, on an adjacent seat, sidewall, or floor mounted. In some embodiments, an electrical switch may be used instead of a handle. The switch, which may be located remotely from the stow bin 510, may cause an electromechanical actuator to actuate the master cylinder.

As a benefit, the handle (or switch) may be placed above the floor at a location that is optimized for human factors, and the latches are placed at weight optimized locations based optimum door hinge location and on total weight of the primary support structure plus payload commodities.

The latch mechanism also offers better haptics than latch mechanisms equipped with trigger-pull mechanical latches. Popping or snapping upon release can be adjusted. Moreover, the "feel" of the entire actuation stroke can be adjusted.

The stow bin 510 offers several advantages over conventional stow bins. The dual retention latch mechanism replaces a large complex linkage with simple linkages that are substantially smaller and lighter. Moreover, moving parts are minimized, as are mechanical linkage friction and breakage, which reduces maintenance issues.

The dual retention latch mechanism eliminates suboptimal mechanism features (e.g., torque tubes) which take up valuable storage volume e.g. torque tube cover. Consequently, stow bin volume is better utilized.

Figure 7:
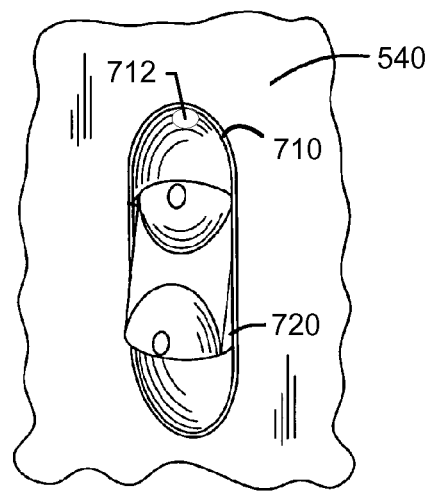
FIG. 7 is an illustration of a stowage bin handle.

Reference is now made to FIG. 7, which illustrates an example of a door 540 having a handle 710 for actuating the master cylinder. If the cylinders are daisy-chained, then there is backpressure on both faces of pistons at all times so that line pressure indicates proper failsafe function. The loss of back pressure indicates a system failure, which could result from a leakage. A pressure sensitive plastic fitting 712 in the hydraulic circuit (see FIG. 2) may be located adjacent to or within the handle 710 to indicate the loss of backpressure. The fitting 712 may include a spring loaded mechanism that moves a popup indicator in response to the loss in backpressure. In other embodiments, the fitting 712 could cause an indicator such as an LED to change color. The handle 710 may have a colored edge 720 for a visible indication that the latch is not fully closed. The routine preflight check of stow bins would be greatly aided by these features.

Figure 8:
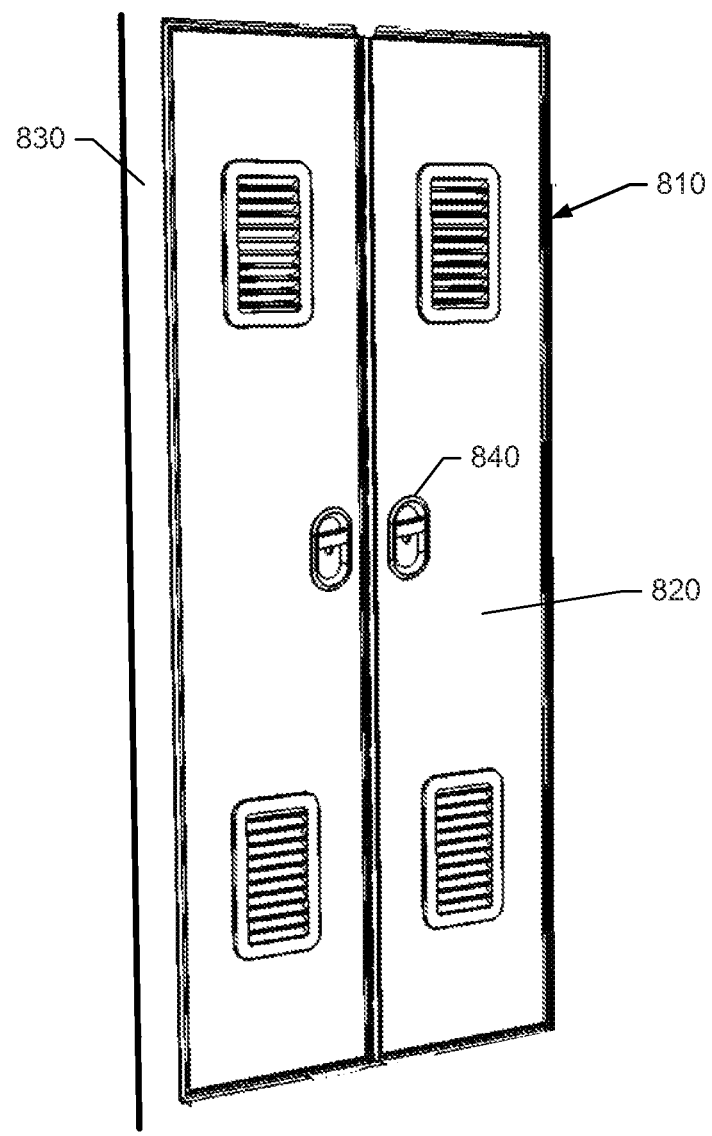
FIG. 8 is an illustration of a maintenance access panel for a commercial aircraft.

Reference is now made to FIG. 8, which illustrates a maintenance access panel 810. The access panel 810 includes access doors 820 that are hinged to a frame 830. Each door 820 is latched to the frame 830 by a dual retention latch mechanism. Each latch mechanism includes first and second latches at opposite sides of a door 820, and master and slave cylinders (not visible in FIG. 8), and a single handle 840 for actuating the master cylinder. The single handle 840 is easier to operate than two handles at opposite sides of the door 820.

In some embodiments, including the embodiment of FIG. 8, the door 820 is latched in the closed position. In other embodiments, however, the access door 820 may be latched in the open position. For instance, a heavy door access door might cause injury or damage if it was to close unexpectedly. Latching the heavy access door 820 in the open position can prevent injury or damage.

The invention claimed is:

1. A storage system comprising:
    a storage compartment having a compartment door;
    a plurality of latches for latching the door, the latches being closed by the door;
    a plurality of slave cylinders coupled to the latches; and
    a master cylinder in fluid communication with the slave cylinders for causing the slave cylinders to simultaneously open the latches but not to close the latches.

2. The system of claim 1, wherein the master and slave cylinders are daisy-chained so as to be forced to move in exact synchronization, wherein output flow from one of the slave cylinders is used to pressurize another one of the slave cylinders.

3. The system of claim 1, wherein the master and slave cylinders form a closed loop hydraulic circuit such that the movement of pistons in the slave cylinders are constrained to be simultaneous with movement of a piston in the master cylinder.

4. The system of claim 3, further comprising a pressure sensitive fitting for detecting a loss of backpressure in the circuit.

5. The system of claim 3, further comprising spring-loaded mechanisms that constrain movement of pistons of the slave cylinders to be identical in an open stroke; wherein each spring-loaded mechanism applies a spring force to independently return each latch to a closed position instead of the latches being closed by the door.

6. The system of claim 1, wherein the plurality of latches includes a first latch that is configured to secure a first side of the door and a second latch that is configured to secure a second side of the door; and wherein the slave cylinders include a first and second slave cylinders coupled to the first and second latches, respectively.

7. The system of claim 6, wherein the compartment further includes a strong back; and wherein the latches and slave cylinders are supported by the strong back.

8. The system of claim 1, further comprising a handle for actuating the master cylinder, wherein the handle and the master cylinder are mounted on the door.

9. The system of claim 1, wherein the master and slave cylinders cooperate to provide a non-linear curved stroke.

10. A latch mechanism for latching a door to a structure, the mechanism comprising:
    first and second door latches configured to be closed by closing the door;
    first and second slave cylinders for applying unlatching forces to open the first and second latches, respectively; and
    a master cylinder in fluid communication with the first and second slave cylinders for causing the slave cylinders to simultaneously apply the unlatching forces to open the first and second latches but not to apply forces that open the latches.

11. The mechanism of claim 10, wherein the master and slave cylinders are daisy-chained so as to be forced to move in exact synchronization, wherein the master cylinder pressurizes the first slave cylinder, output flow from the first slave cylinder is used to pressurize the second slave cylinder, and output flow from the second slave cylinder is returned to the master cylinder.

12. The mechanism of claim 10, wherein the master and slave cylinders form a closed loop hydraulic circuit such that the movement of pistons in the slave cylinders are constrained to be simultaneous with movement of a piston in the master cylinder.

13. The mechanism of claim 12, further comprising a pressure sensitive fitting for detecting a loss of backpressure in the circuit.

14. The mechanism of claim 10, further comprising a switch or handle for causing the master cylinder to be actuated, the switch or handle located remotely from the door.

15. The mechanism of claim 10, wherein the master and slave cylinders cooperate to provide a non-linear curved stroke.

16. An aircraft comprising:
    a plurality of compartments including compartment doors; and
    a plurality of hydraulically actuated latch mechanisms for the doors, each latch mechanism including a plurality of slave cylinders; and a master cylinder in fluid communication with the slave cylinders for causing the slave cylinders to simultaneously unlatch its associated door.

17. The aircraft of claim 16, wherein the latch mechanisms are dual retention.

18. The aircraft of claim 16, wherein the compartments include stow bins.

19. The aircraft of claim 16, wherein the compartments include maintenance access panels.

20. The aircraft of claim 16, wherein the master and slave cylinders of each mechanism form a closed loop fluid circuit; and wherein each mechanism further includes means for providing a visual indicator of loss in backpressure in the fluid circuit.

* * * * *